United States Patent [19]

Ruff

[11] Patent Number: 5,011,524

[45] Date of Patent: Apr. 30, 1991

[54] ICE MAKER AND WATER PURIFIER EMPLOYING PRE-COOLED MAKE-UP WATER

[75] Inventor: John D. Ruff, Alexandria, Va.

[73] Assignee: Thermadyne, Inc., Alexandria, Va.

[21] Appl. No.: 471,884

[22] Filed: Jan. 29, 1990

Related U.S. Application Data

[63] Continuation-in-part of Ser. No. 278,447, Dec. 1, 1988, Pat. No. 4,897,099.

[51] Int. Cl.⁵ ............................................... B01D 9/04
[52] U.S. Cl. ......................................... 62/532; 62/348
[58] Field of Search ................. 62/123, 348, 532, 541, 62/542

[56] References Cited

U.S. PATENT DOCUMENTS

| | | | |
|---|---|---|---|
| 2,775,100 | 12/1956 | Howe | 62/123 X |
| 3,338,065 | 8/1967 | Ashley | 62/542 X |
| 3,779,029 | 12/1973 | Larriva | 62/348 X |
| 4,262,489 | 4/1981 | Sakamoto | 62/124 |
| 4,338,794 | 7/1982 | Haasis, Jr. | 62/348 |
| 4,370,865 | 2/1983 | Hibino et al. | 62/124 |
| 4,881,378 | 11/1989 | Bryant | 62/348 |

Primary Examiner—William E. Tapolcai
Attorney, Agent, or Firm—Epstein, Edell & Retzer

[57] ABSTRACT

The efficiency of the system disclosed in my U.S. Pat. No. 4,897,099, wherein purified ice pieces and purified liquid water are derived from tap water, is improved by transferring heat from the tap water to the collected ice pieces. The transferred heat warms the ice pieces to decrease the energy required to melt the ice pieces and form the purified liquid water. The heat transfer also pre-chills the tap water to assist in forming the ice pieces.

6 Claims, 1 Drawing Sheet

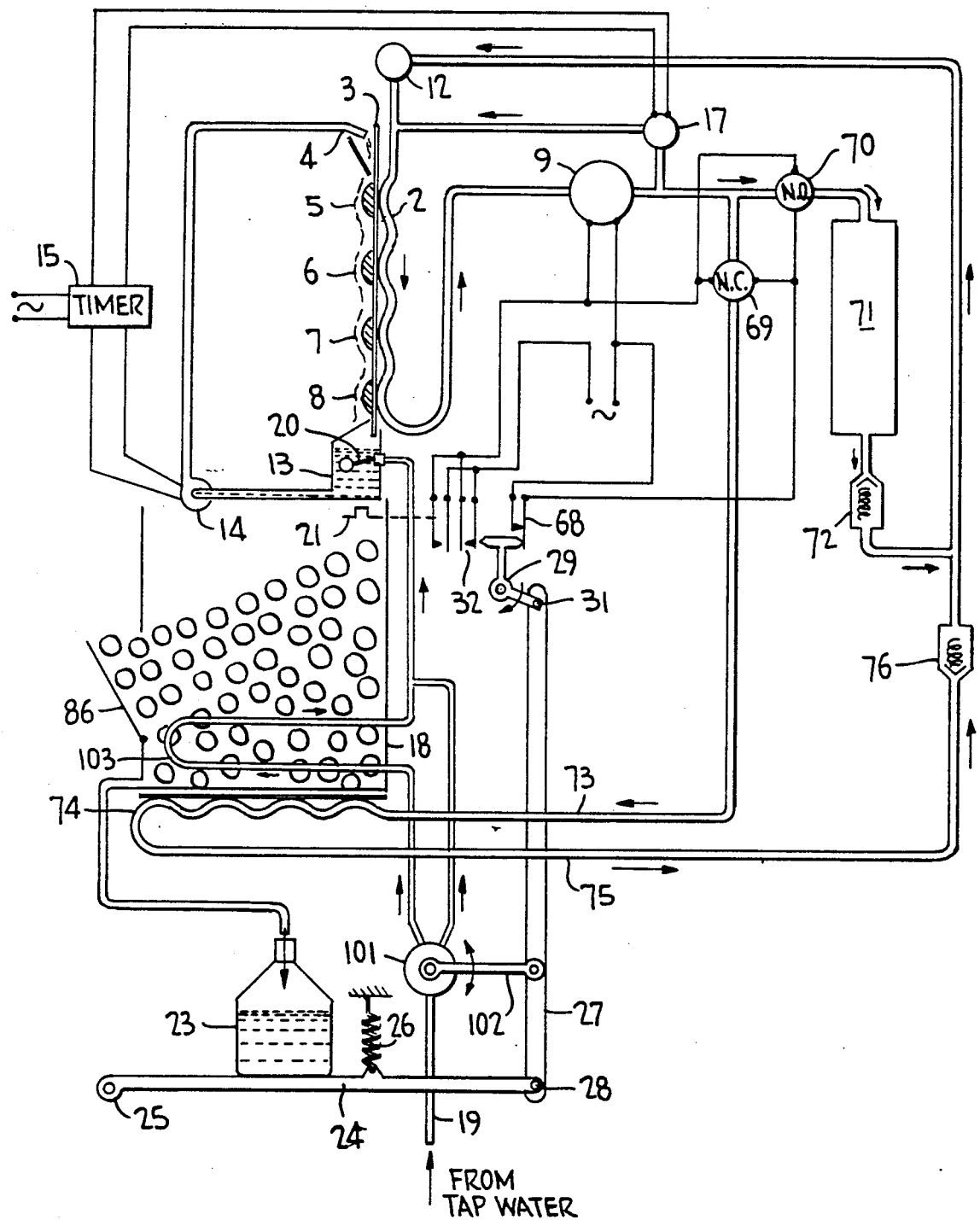

ICE MAKER AND WATER PURIFIER EMPLOYING PRE-COOLED MAKE-UP WATER

CROSS-REFERENCE TO RELATED APPLICATION

This application is a Continuation-in-Part of my prior U.S. Pat. Application Ser. No. 07/278,447, filed Dec. 1, 1988, now U.S. Pat. No. 4,897,099. The entire disclosure in that patent is expressly incorporated herein by this reference.

BACKGROUND OF THE INVENTION

The present invention relates to methods and apparatus for providing purified ice and purified water from a source of unpurified water. More particularly, the invention relates to increasing the efficiency of the ice-making and ice-melting functions of the method and apparatus disclosed in my prior U.S. Pat. No. 4,897,099.

In the aforesaid patent I disclose a method and apparatus for providing purified ice pieces from unpurified water such as tap water. The ice pieces are periodically harvested and collected in a bin, the bottom of which is controllably heated as necessary to melt some of the purified ice pieces and, thereby, provide purified water. I have found that the system disclosed in my aforesaid patent is not as efficient as it might otherwise be due to the fact that the unpurified water is typically at room temperature and must be cooled from that temperature to below the freezing temperature of water in order to form the required ice pieces. Moreover, in melting the purified ice pieces to provide purified water, all of the melting energy is derived from externally of the system or from the refrigerant in the cycled refrigerant path employed to effect freezing. As a consequence, significant additional energy expenditure is required in the cycled refrigerant flowpath.

OBJECTS AND SUMMARY OF THE INVENTION

It is an object of the present invention to improve the efficiency of the ice-forming and ice-melting functions in the method and apparatus disclosed in my aforesaid U.S. Pat. No. 4,897,099.

In accordance with the present invention, tap water or unpurified water derived from some other source is selectively passed through a heat exchanger tube located inside and near the bottom of the ice collection bin when the system is in the ice-making mode. Heat from the water in the heat exchanger tube is absorbed by the adjacent ice pieces to assist in the melting function. The unpurified water is then passed to the sump where such water is used to supply water for the ice-making function. The pre-cooling of the raw water significantly reduces the energy and time required to form the ice pieces.

BRIEF DESCRIPTION OF THE DRAWINGS

These and other objects, features and many of the attendant advantages of the present invention will be appreciated more readily as they become better understood from a reading of the following description considered in connection with the accompanying drawings wherein the single figure is a schematic flow diagram of a system employing a preferred embodiment of the present invention.

DESCRIPTION OF THE PREFERRED EMBODIMENTS

In order to facilitate reference to the disclosure material incorporated herein from my U.S. Pat. No. 4,897,099, two-digit reference numerals appearing in the accompanying drawing correspond to those employed in the patent for like elements. Three-digit reference numerals appearing in the accompanying drawing designate elements not appearing in the aforesaid patent. In the interest of brevity and to facilitate understanding of the subject matter of the present invention, the following description omits a detailed description of those portions of the system not directly related to that subject matter.

Referring now specifically to the drawing, the present invention is employed in a system wherein purified ice is formed on plate 3 and collected in a bin 18. Compressor 9 draws refrigerant fluid from evaporator 2 and discharges it to condenser 71 when the system is an ice-making, non-melting mode. When purified water container 23 is less than full, control spring 26 pulls platform 24 upwardly, thereby moving control link 27 upwardly and rotating rocker arm 29 counterclockwise to close switch 68 and actuate solenoid valves 69, 70. The actuated solenoid valves divert the refrigerant flow from non-melting condenser 71 to melting condenser 74, thereby providing rejection heat to melt ice in bin 18. Purified water from this melting action drains to container 23 where it is collected for use. Raw water in sump 13 is recirculated over plate 3 by pump 14 under the control of timer 15, the level in sump 13 being maintained by float valve 20 with water from make-up line 19. Switch 32 is closed by rocker arm 29 when water container 23 is less than full, causing compressor 9 to continue running while the system is in the melting mode.

The system as thus far described corresponds to one of the embodiments disclosed in my aforesaid patent. Other embodiments of the system disclosed in that patent utilize warm air or warm water to provide the heat required to melt ice in bin 18. However, all of those embodiments employ an ice collection bin 18 in which some of the collected ice is melted, a control link 27 capable of initiating the melting function in response to the water level in a container 23, and a water make-up line 19.

In accordance with the present invention, water flow valve 101 is actuable by a control arm 102 attached to control link 27. When the system is in the melting mode (i.e., container 23 is less than full), link 27 is in its uppermost position and control arm 102 is rotated counterclockwise. Valve 101 causes tap water flowing in line 19 to be diverted through heat exchanger tube 103 to sump 13. The heat exchanger tube 103 is located at the lower part of bin 18, either inside the bin or outside, and attached to the metal bin wall so that tap water flowing through the heat exchanger to the sump provides heat to melt the ice pieces while being chilled in the process. This chilled water then flows to sump 13 under the control of float valve 20.

When purified water container 23 is full, link 27 is drawn downwardly by the weight of the water and the container, thereby rotating rocker arm 29 clockwise and discontinuing the ice-melting function. Under such circumstances the control arm 102 is also rotated clockwise and valve 101 causes water from tap water line 19 to flow directly to sump 13, thereby bypassing heat exchanger tube 103. This prevents the undesirable melting of ice at times when ice making is required due to a low ice level in bin 18 but the melting function is not required because purified water container 23 is full. Low ice level in bin 18 is detected by bin switch 21 arranged to activate compressor 9 to make ice pieces regardless of the level of water in container 23.

The diverting of make-up water through heat exchanger 23 need not necessarily be effected by the water flow valve 101 linked as illustrated to linkage arm 27; rather, this function may be effected by other means such as an electrically operated valve or any other diverter mechanism capable of diverting make-up water selectively when the system is in the ice-melting mode.

The essence of the invention is the energy saving effected by the utilization of heat from the relatively warm tap water to assist condensor 74 in melting ice pieces to provide purified water while simultaneously chilling the tap water so that it is pre-cooled before being frozen to form the ice pieces.

From the foregoing description it will be appreciated that the invention makes available a novel method and apparatus for improving the efficiency of a system in which purified ice pieces are formed from unpurified water and collected in a bin for use, some of the purified ice pieces being melted as needed to provide purified liquid water. The efficiency of the system is improved by: (1) preheating the ice pieces to be melted by passing the unpurified water through a heat exchanger disposed to transfer heat from the tap water to the ice pieces; and (2) utilizing the thusly chilled unpurified water to form the purified ice pieces.

Having described preferred embodiments of a new and improved ice maker and water purifier utilizing pre-cooled make-up water in accordance with the present invention, it is to be understood that other modifications, variations and changes will be suggested to those skilled in the art in view of the teachings set forth herein. All such variations, modifications and changes are believed to fall within the scope of the present invention as defined by the appended claims.

What is claimed is:

1. In a system for providing purified ice pieces from a source of unpurified water, collecting the ice pieces in a bin, and providing purified liquid water by selectively melting some of the ice pieces, a method of improving the efficiency of the system comprising the steps of:
   (a) transferring heat from said unpurified water to some of said ice pieces in said bin while chilling the unpurified water;
   (b) utilizing the unpurified water chilled in step (a) to form said ice pieces;
   wherein said ice pieces are formed by the steps of:
   (c) collecting said chilled unpurified water in a sump;
   (d) selectively pumping the chilled unpurified water from said sump to a nozzle;
   (e) issuing the chilled unpurified water from said nozzle as a stream against a surface having selectively chilled locations thereon to form said ice pieces at said locations; and
   (f) collecting in said sump all water from said stream not incorporated into said formed ice pieces;
   wherein the purified liquid water is provided by the step of heating the bottom of said bin to melt ice pieces to which heat is transferred according to step (a).

2. The method according to claim 1 wherein step (a) includes the step of conducting the unpurified water to said sump via a heat exchange passage disposed in said bin adjacent said some of said ice pieces.

3. The method according to claim 2 further comprising the step of selectively diverting said unpurified water away from said heat exchange passage to flow directly from said source to said sump.

4. In a system for providing purified ice pieces from a source of unpurified water, collecting the ice pieces in a bin, and providing purified liquid water by selectively melting some of the ice pieces, a method of improving the efficiency of the system comprising the steps of:
   (a) transferring heat from said unpurified water to some of said ice pieces in said bin while chilling the unpurified water;
   (b) utilizing the unpurified water chilled in step (a) to form said ice pieces;
   wherein step (a) includes the step of, prior to using the unpurified water to form ice pieces, conducting the unpurified water through a heat exchange passage disposed in said bin adjacent said some of said ice pieces; and
   further comprising the step of selectively diverting said unpurified water away from said heat exchange passage to flow directly from said source to provide said ice pieces.

5. A method for providing a supply of purified ice and a supply of purified liquid water from a source of unpurified liquid water, said method comprising the steps of:
   (a) cooling selected areas of at least one ice-forming surface to a temperature below the freezing temperature of water;
   (b) directing a water stream of the unpurified liquid water over said selected areas to form ice at said selected areas while washing impurities away from the formed ice with said steam;
   (c) collecting in a sump portions of said water stream that do not form said ice;
   (d) recycling into said water stream portions of the water stream collected in step (c);
   (e) adding additional unpurified water to said sump from said source to replace water formed as ice in step (b);
   (f) increasing the temperature at said selected areas at various times to remove said ice from said ice-forming surface;
   (g) collecting in a bin the ice removed in step (f);
   (h) warming a portion of said bin at selected times to melt some of the ice therein into purified liquid water;
   (i) collecting in a container the purified liquid water derived in step (h); and
   (j) flowing unpurified water from said source to said sump through a heat exchanger in thermal contact with said ice in said bin at said selected times to assist said warming of said portion of said bin and pre-cool said additional unpurified water 6. The method according to claim 5 further comprising the step of selectively diverting away from the heat exchanger and directly to said sump the unpurified water flowing from said source in step (j).

* * * * *